(12) United States Patent
Thenthiruperai et al.

(10) Patent No.: US 7,069,014 B1
(45) Date of Patent: Jun. 27, 2006

(54) BANDWIDTH-DETERMINED SELECTION OF INTERACTION MEDIUM FOR WIRELESS DEVICES

(75) Inventors: Balaji S. Thenthiruperai, Overland Park, KS (US); Clyde Heppner, Liberty, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 240 days.

(21) Appl. No.: 10/744,859

(22) Filed: Dec. 22, 2003

(51) Int. Cl.
*H04Q 7/20* (2006.01)
*H04M 1/00* (2006.01)
*H04L 12/66* (2006.01)
*G06F 15/173* (2006.01)

(52) U.S. Cl. .................. 455/452.2; 455/558; 370/352; 709/226; 709/227

(58) Field of Classification Search ............. 455/452.2, 455/558, 435.1; 370/352; 705/14; 709/226, 709/227
See application file for complete search history.

(56) References Cited

U.S. PATENT DOCUMENTS

| | | | |
|---|---|---|---|
| 2002/0059638 A1* | 5/2002 | Oz et al. ..................... | 725/129 |
| 2002/0120749 A1* | 8/2002 | Widegren et al. ........... | 709/227 |
| 2003/0028643 A1* | 2/2003 | Jabri ........................... | 709/226 |
| 2003/0110236 A1 | 6/2003 | Yang et al. .................. | 709/219 |
| 2003/0110297 A1 | 6/2003 | Tabatabai et al. ........... | 709/246 |
| 2003/0156578 A1* | 8/2003 | Bergenlid et al. ........... | 370/352 |
| 2004/0034723 A1* | 2/2004 | Giroti ............................ | 710/8 |
| 2004/0043770 A1* | 3/2004 | Amit et al. .................. | 455/450 |
| 2004/0057420 A1* | 3/2004 | Curcio et al. ............... | 370/352 |
| 2004/0117255 A1* | 6/2004 | Nemirofsky et al. .......... | 705/14 |
| 2004/0266480 A1* | 12/2004 | Hjelt et al. .................. | 455/558 |
| 2005/0060411 A1* | 3/2005 | Coulombe et al. .......... | 709/227 |

OTHER PUBLICATIONS

Patent Application of Kevin Packingham, et al., "Method and System for Multi-Modal Interaction" U.S. Appl. No. 10/074,513, filed Feb. 12, 2002, currently pending.
The Enterprise IT Conference & Expo, *Browser-optimized Content Delivery*, Copyright Jupitermedia Corporation, 2003.
W3C Consortium, *Multimodal Interaction Use Cases*, W3C Note 4, Dec. 2002.
W3C Consortium, XHTML+*Voice Profile* 1.0, W3C Note 21, Dec. 2001.
David Pearce, *Enabling New Speech Driven Services for Mobile Devices: An overview of the ETSI standards activities for Distributed Speech Recognition Front-ends*, ETSI STQ Aurora Working Group paper, 2000.

(Continued)

Primary Examiner—George Eng
Assistant Examiner—Kiet Doan

(57) ABSTRACT

A method is provided for controlling, i.e., changing, the medium or mode for interaction between a user of a wireless device and an application accessed by the wireless device. The method includes the step of a) determining the currently available bandwidth for transmissions to the wireless device over a wireless network, and b) of changing the medium for interaction between the user of the wireless device and the application from a first medium (e.g., audio+video) to a second medium (e.g., audio only or text) based on the bandwidth determined in step a). Steps a) and b) can be provided via function calls or other instructions in the application, can be provided by a network entity, or, alternatively can be based in part by user interaction with the wireless device.

4 Claims, 6 Drawing Sheets

OTHER PUBLICATIONS

David Pearce et al., *The Impact of Distributed Speech Recognition on Multi-modal interfaces to the Mobile Web*, ETS STQ Aurora Working Group paper, 2000.

Anoop K. Sinha, et al., *Visually Prototyping Perceptual User Interfaces Through Multimodal Storyboarding*, Group of User Interface Research, University of California, Berkeley, pp. 1-4, ACM 2001.

Austaller, et al., *Gulliver Beans: Generating Device Optimized and Individualized Content for WAP Applications*, The Gulliver Projekt Team, University of Linz, Austria, Mar. 2000.

Kevin Lai, et al., *Nettimer: A Tool for Measuring Bottleneck Link Bandwidth*, Department of Computer Science, Stanford University, pp. 1-13, Apr. 4, 2001.

Anderson, et al., *System Support for Bandwidth Management and Content Adaptation for Internet Applications*, Proceedings of the Fourth Symposium on Operating Systems and Design Implementation, OSDI 2000, Oct. 25, 2000.

Rakesh Mohan, et al., *Adapting Mulitmedia Internet Content for Universal Access*, IEEE Transactions on Multimedia, vol. 1, No. 1, pp. 1-35, 1999.

* cited by examiner

BANDWIDTH-DETERMINED SELECTION OF INTERACTION MEDIUM FOR WIRELESS DEVICES

BACKGROUND

The present invention relates to wireless communications devices and, more particularly, to methods and apparatus for determining and selection of a medium or mode by which a user interacts with an application using a wireless communication device depending on the available bandwidth over the air interface.

Many people are increasingly relying on the use of wireless communication devices to access applications executing on an application server on the World Wide Web. Examples of such applications could be voice command applications, wherein a user interacts with an application via speech input, for example weather reports, stock quotes, voice activated dialing, etc., business-related applications (such as package delivery, trucking, vending applications, etc.), and streaming media applications. Examples of wireless devices used in these types of applications include laptop computers, wireless telephones, personal digital assistants ("PDAs"), and special purpose wireless communications devices used for specific business applications.

In general, such wireless devices are able to act as wireless client devices in sessions with application servers. During such sessions, the wireless client devices receive, over an air interface, information or media content formatted for a given presentation mode. Such content or information may include voice (or other audio), text or video information. Such wireless client devices also transmit information to servers during interactive sessions, and this information may originate as non-voice (e.g., graffiti, touch, or keypad) input from users, or as speech input. Content or information in more than one type of medium, such as audio and graphics, may be referred to as multimodal interaction. As just one example, multimodal content delivered to a wireless device may comprise a combination of Voice Extensible Markup Language (VoiceXML) and Wireless Markup Language (WML) content.

The term "interaction medium", as used herein, refers to the presentation mode or modes that define the way the user interface of a wireless device presents content or information to the user, and the mode(s) or way(s) in which the user interacts with the application. The term "interaction medium" is thus an overarching term used to define how the user interacts with the application both in terms of delivery of content from the application server, plus the medium or mode(s) in which the user provides input or interacts with the application (e.g., through text, voice, or other mode); the format of the content from the application server is a subset of the overall interaction medium/media. For example, a wireless device may have a browser function to allow content to be presented in a screen-based presentation mode, e.g., to be visually displayed on a screen, one screen at a time, in addition to audio content that may be coordinated with the display. The user may interact with the application through speech. However, the user may be in an environment where providing speech input is difficult. The user may wish to change the user input medium from speech to text, and not change the format for content delivered to the wireless device.

Presentation modes other than screen-based visual modes are also possible. For example, serving nodes can receive content written in a voice-based markup language, such as VoiceXML or Speech Application Language Tags (SALT). This content can then be interpreted and processed for presentation to users as voice-based information. Similarly, users of wireless client devices can input information or make selections in various modes, such as voice command mode (e.g., speaking commands or data) or touch (e.g., tapping a screen, typing letters and numbers).

A multi-modal interaction medium is a cohesive way of presenting information through auditory and visual channels of presentation and interface layers. Multimedia can be considered as a subset of multimodality, especially when visual elements are combined with auditory elements for presentation. Multimedia content may be broadly classified into video content (which contains visual and auditory elements) and audio (pure audio) content. Video content can be further classified into five general types, each of which require different amounts of bandwidth for acceptable and optimal user experience. These types of video content include the following types which we have defined:

Talking Head Example: A video email clip with a daughter sending a message to her mother.

Animation Example: A clip of the Simpsons animated TV show.

Low Live Action Example: A clip of Tiger Woods bouncing a golf ball on a golf club. This type of video has some still imagery from frame to frame (e.g., background) and some moving imagery (e.g., the path of the ball). Generally, in low live action, the still imagery is prevalent and thus can be encoded with fewer bits.

Medium Live Action Example: A clip of a bear and fisherman fighting over a salmon. This type of video has a higher preponderance of imagery that changes from frame to frame and thus generally requires higher frame rates and more bandwidth to render it an acceptable form to the user.

High Live Action Examples: Michael Jordan dunking to win the slam-dunk competition or a music video clip. This type of video has the highest level of action and thus requires the highest amount of bandwidth.

In certain applications where the user is also provided with the opportunity to interact with the application via speech, the different categories of multimedia can be combined with speech recognition to provide command and control of the interface through a combination of the voice user interface and a graphical user interface on the wireless device. The user may interact with the application and information may be presented to the user in several alternative interaction media, as listed below:

1) Text only: Information presented as text, e.g. News article on the UN.
2) Text and pictures: Information may be embellished with pictures, e.g. stock updates with a line graph.
3) Audio only: Information presented in an auditory format, e.g. a newsroom or news channel accessed from a voice command platform.
4) Audio and pictures: e.g., J2ME media players with a picture and audio associated with that picture or slide.
5) Audio and video: e.g., media content streamed from a media gateway, e.g. ESPN Sports Center streamed over the Internet. Furthermore, the video could be presented in any of the five types of video content listed above (talking head, animation, low live action, medium high action, and high live action). It will be understood that the five types of video content described above are non-standard definitions, and that other types of video content could be used depending on technology constraints, such as frame rate or encoding technique.
6) Audio and Text: e.g., Song plus text listing artist and song title.

Since multimodal applications can be provided to the user in these different formats or interaction media, and since each format has its own bandwidth requirements for acceptable user experience, it becomes imperative that there is enough bandwidth to provide all the different types of format in a cohesive manner. Moreover, a significant portion of the bandwidth can be used simply in having a speech channel open to facilitate speech recognition during the execution of the application. Problems can arise if the available bandwidth is less than that required for the optimal user experience with the current interaction medium. One reason for reduction or change in available bandwidth is the user moving through the wireless network and the fact that signal reception can change based on the location of the wireless device.

One way to reduce the bandwidth associated with speech recognition would be to use Distributed Speech Recognition (DSR). DSR enables recognition at the mobile terminal level and it also allows the computationally intensive recognition to be performed at a remote server, with negligible loss in performance. DSR reduces the bandwidth requirements for speech recognition and increases the performance of the speech application by improving accuracy. The first DSR standard was published by ETSI in February 2000 and an advanced standard is now being developed. The bandwidth requirement as prescribed by the standard is around 4.8 kbits/s. However, the reduction in bandwidth usage using DSR may not be enough to maintain an optimal user experience where the bandwidth over the air interface is reduced.

Further background information is discussed in the article of Mohan et al., *Adapting Multimedia Internet Content for Universal Access*, IEEE Transactions on Multimedia, Vol. 1, No. 1, (1999), and in the article of Andersen et al., *System Support for Bandwidth Management and Content Adaptation for Internet Applications*, Proceedings of the Fourth Symposium on Operating Systems Design and Implementation, OSDI 2000, Oct. 23–25, 2000, the content of both of which is incorporated by reference herein.

The present invention provides for bandwidth-based changing or selection of an appropriate interaction medium by which a user interacts with an application with a wireless device. Unlike in prior art methods, the interaction medium includes the interaction format or mode by which the user provides input to the application, e.g., through voice, text or other method. The changing of the interaction medium can be performed by the application itself, by a network entity besides the entity executing the application, by a combination of the network entity and the application, or by the user, in various embodiments of the invention. Moreover, the selection of interaction medium is applicable beyond merely situations where media is streamed to the wireless device. In particular, the present invention is highly suitable for use in situations in which there is a high degree of user input with the application (e.g., through voice or text) such as in a generic speech-based application or a speech/text and/or graffiti based multimodal application.

SUMMARY

In a first aspect, a method is provided for controlling, i.e., changing, the medium or mode for interaction between a user of a wireless device and an application accessed by the wireless device. The medium or mode of interaction pertains to communication in both directions between the wireless device and the application. The application may be a voice command application, business-related application, streaming media application or other type of application. The application executes on a network element in a packet switched network, such as an application server or voice command platform, located on an IP network such as the Internet.

The method includes the step of a) determining the currently available bandwidth for transmissions to the wireless device over a wireless network that connects the packet switched network to the wireless device. Methods for determining the bandwidth are known in the art and the manner of determining bandwidth is not considered critical. The method further includes a step b) of changing the medium for interaction between the user of the wireless device and the application from a first medium (e.g., audio+video) to a second medium (e.g., audio only and/or audio plus text) based on the bandwidth determined in step a).

In one possible embodiment, the step b) of changing the medium is performed by execution of machine-readable instructions coded in the application. For example, the application may obtain current bandwidth information from a function call to a subroutine that determines the current bandwidth and determine that high bandwidth consuming data, e.g., high action video, cannot continue to be provided to the user and so the application proceeds directly to transmit only text or audio data to the user, or low action video plus audio. This aspect may be implemented for example by providing code in the application calling a subroutine that determines or obtains current bandwidth information, and then, depending on the current bandwidth, the code executes a "goto" command that causes execution of the application to go to a block of code transmitting information or content to the user in a different medium or mode. Thus, in one example, where bandwidth drops, e.g., due to a weak signal over the air interface, the user interaction medium may change to a low bandwidth medium, e.g., text, that allows the user to interact with the application and maintain a satisfactory user experience. Later, the application will again check the available bandwidth (by calling the bandwidth determination subroutine), and if the bandwidth has improved, for example if the user enters a territory in the wireless network with better signal coverage and higher available bandwidth, the application can change the interaction medium or mode again and start providing content or user interaction in a new mode or medium, e.g., video, audio or voice mode, etc.

While the use of a "goto" command is one possibility for how the application may change interaction medium, other programming techniques are possible. For example, the application could define one or more events as XML events, and upon the occurrence of a particular event (bandwidth less than some defined value) the application reverts to a predefined interaction medium (e.g., speech mode, text mode, combination thereof, low live action video, etc.). As another alternative, the application could include reference files in the beginning of the code which define the environment for the application and specify the interaction medium/media depending on the measured bandwidth.

In the embodiments where the application specifies the interaction medium based on bandwidth, it will be apparent that the application developer maintains some control over the interaction medium, by inserting into the application the determine bandwidth subroutine call at appropriate application states and inserting "goto", transcoding function calls, XML events, or other appropriate instructions based on the available bandwidth. An application developer may format content, especially video content, in a variety of different types, as described herein, to account for the possibility of limited bandwidth, and responsively change modes among a variety of modes to optimize the user experience. Similarly, the application developer may provide audio content into a text format and allow the user to interact with text if there is not enough available bandwidth to transmit audio or speech information, and thus maintain an acceptable user experience.

The changing of the interaction medium can also be performed in a network element besides the application server. In this situation, the network element can take complete control of the application and determine the bandwidth available before a particular XML document is loaded and rendered to the user. Once the network element determines the available bandwidth, the network element will render only those parts of the application that will provide the optimal user experience. Such rendering of content could take the form of transcoding content from one form or another to change the medium or mode, deletion or addition of one or more types of content, or other technique. The system may make reference to predefined events dictating how the interaction medium should change based on bandwidth, or may change the interaction medium using a separate logical entity, such as a "bandwidth manager" or "policy manager" that contains instructions on how to change interaction medium based on available bandwidth, as described in detail below.

In yet another possible embodiment, both the application developer and the network element can share the control of the interaction medium. In this scenario, the network element determines the bandwidth and the application tells the network the type of content that needs to be rendered for the application for a given amount of bandwidth. This mutual sharing of information, e.g., over a control channel or by other means, will be beneficial to the network as well as the application developer in providing the optimal user experience. For example, if available bandwidth is below 10 Kbps and the type of content that needs to be rendered by the application is video type with a greater bandwidth requirement, e.g., the type "talking head", in addition to audio and speech recognition for voice interaction with the application, then the network would advise the application to provide audio and speech recognition, and leave the visual information out. Furthermore, if the network can predict the availability of bandwidth for the rest of the session then the network element would be able to recommend to the application the optimal interaction medium or media for the rest of the session.

In yet another possible implementation, the available bandwidth could be displayed on the wireless device and the user of the device could select a new interaction medium, e.g., by voice command, by pressing one or more buttons on the wireless device, by clicking an icon, or by any other means. The user selection would be transmitted to a network element on the packet switched network and then the network element, e.g., voice command platform, application server, etc. would then responsively change the interaction medium. Thus, the present invention, in one possible form, enables a wireless user to select or change the interaction medium with an application communicating with the wireless device over an air interface, depending on the available bandwidth.

In another aspect of this invention, an improved wireless communications device having a display, a memory and a processor is provided. The improvement comprises providing in the display visually perceptible indicia of the available bandwidth for communication over an air interface to the wireless device. The visually perceptible indicia could be any suitable type of video display, such as a numerical read-out of available bandwidth, bar-type graphical display; color-coded display, etc. Data on the currently available bandwidth is obtained from a node in the wireless network, the voice command platform, service node, or otherwise using the teachings described herein. Further, the wireless device includes instructions in the memory that are executable by the processor for enabling a user to change the interaction medium depending on the available bandwidth. The user is able to change the interaction medium by providing text or voice responses to prompts, by actuation of buttons on the key pad, or by any other means.

In still another aspect, a system is provided for controlling the interaction medium for a wireless communication device, comprising a network node having a means for determining the bandwidth for communications over an air interface to the wireless device; and a mode selection means responsive to the means for determining bandwidth for changing the interaction medium from a first interaction medium to a second interaction medium based on the determination of bandwidth.

BRIEF DESCRIPTION OF THE DRAWINGS

The following detailed description makes reference to the appended drawings, in which.

DETAILED DESCRIPTION OF A PREFERRED EMBODIMENT

Figure 1:
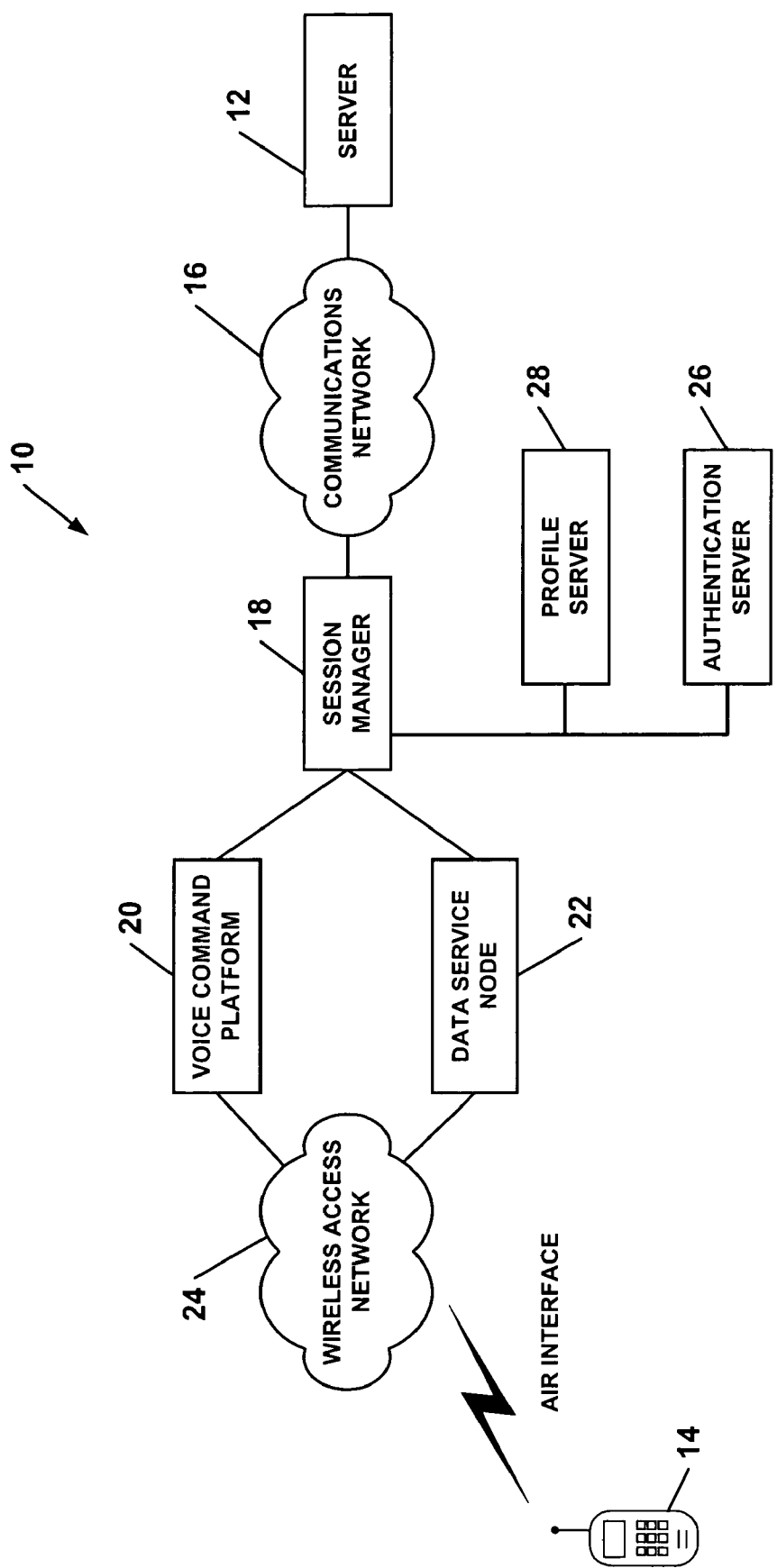
FIG. 1 is a diagram of a communication system in accordance with a representative embodiment of the present system.

This invention relates to methods and devices for managing bandwidth-based changes in the interaction medium for a wireless device communicating with an application over a packet switched network. The changes in the interaction medium can be controlled by instructions in the application itself, by a node in the network, by the user, or using some combination of each. The changes in the interaction medium are done seamlessly in the midst of a single session. For example, during a session in which the user is receiving content using a voice-based presentation mode, the application, network node or the user may determine to switch over to a text based presentation mode, or vice-versa, without losing any data already entered, and without navigating back to the same place in the session where the user was before switching interaction medium.

In one possible embodiment, the interaction medium is managed by a network node. The node could take the form of a session manager logically connected between an application server and a presentation system (e.g., voice command platform or streaming media server) that delivers content in a particular format or interaction medium to a wireless communication device. An example of one such presentation system is a voice-command platform, which provides content formatted for voice-based presentation. Another presentation system is a data service node, which provides content formatted for a text-based interaction medium.

To provide seamless delivery of multi-modal content during switchovers, the session manager keeps track of the state of a user's session. The state of the session could be defined by a set of one or more saved variables.

In contrast to merely passive sessions where the user is provided with content and does not provide input to the application, users may be proactively engaged with interactive applications. In an interactive session, a user might provide input to a server, rather than just receive content from the server. Consider, for example, a truck driver on a delivery route that uses a wireless device to enter package delivery or inventory information via voice input. Bandwidth may degrade due to the driver entering a poor coverage area in the wireless network. Rather than losing the connection or having to reenter data, the application (or network node or the user) may selectively change the interaction medium to be a lower bandwidth mode, such as text only. The change is seamless and no previously entered delivery or inventory data is lost. In this example, the session state could be marked as a flag or a variable that is adjusted to reflect the current interaction medium.

The illustrated embodiments may take advantage of features of storing the session state, d interaction medium data and caching information from the wireless device. Storing session state at the network level, rather than at the client device, has an advantage: seamless switchovers can be made without regard to the client device. In other words, a system provider could supply its customers with multi-modal client devices from any number of manufacturers without requiring specialized hardware or software, without increasing the cost of customer equipment, and without limiting the customer's equipment choices.

Further, due to the processing power and memory capacity available at the network level, a device such as a session manager that is used to implement seamless switchovers could also be used to "transcode" content provided by servers on a network (such as the Internet). Transcoding simply means that content or commands are converted from one protocol or markup language to another. With transcoding, a wireless client device that uses the Wireless Application Protocol (WAP) to receive content in WML can access web servers that use Hypertext Transfer Protocol (HTTP) and that deliver content in another format, such as Hypertext Markup Language (HTML), regardless of the server's format. For example, if the user requests a particular Uniform Resource Locator (URL) via the client device's WAP browser, the session manager can translate the WAP request into an HTTP request, and the web server could respond to the request just as it would to any other HTTP request, returning either WML or HTML content to the session manager. The session manager would then transmit the content to the client device. If the server returned HTML, the session manager could transcode the content to WML so that the client device could present it to the user. Other protocols/markup languages could be transcoded as well. If the server returned WML content, no transcoding would be needed, and the session manager could forward the content to the client device for presentation.

Referring now to the drawings, FIG. 1 illustrates a system 10 in which the exemplary embodiments can be employed. In system 10, an application server 12 delivers content to and interacts with a communication device, such as wireless client device 14, via a wireless network and a packet switched network which may include intermediate networks and various network elements, which could include: a packet switched communications network 16 (which may be or may include the Internet); a session manager 18; a voice-command platform 20; a data service node 22; a and wireless access network 24. The wireless access network 24 communicates with the wireless client device 14 via an air interface, as shown. The wireless access network 24 may include elements such as mobile switching centers, base transceiver stations, base station controllers, and/or other elements to provide network connectivity to wireless client devices in the system. These details are unimportant and therefore a discussion is omitted. To provide additional functionality, the session manager 18 may also be logically connected to an authentication server 26 and a profile server 28. The functions performed by the session manager 18, authentication server 26, and profile server 28 could be implemented with commercially available servers such as the Sun Solaris, Dell NT, IBM AIX, or other servers.

The voice-command platform 20 provides an interface between a voice-based communication device, such as a telephone, and the application server 12. Generally, the voice-command platform 20 can receive spoken commands or data inputs from a user of wireless client device 14 and convert them to inputs that are recognized by server 12. In addition, voice-command platform 20 can receive content from server 12 and present it to the user as spoken responses to the user's queries or as voice prompts for further user inputs. For example, voice-command platform 20 could speak to the user the prompt: "Please enter your last name by spelling it." This is the voice-command equivalent to a text entry box that might be presented by server 12 to a user in screen-based presentation mode. In response to the prompt, the user could spell his or her last name, just as a screen-based user would type his or her last name.

Although a wireless communication device (i.e., wireless client device 14) in the form of a phone is shown in the exemplary system for purposes of illustration, those skilled in the art will recognize that the invention could be carried out using virtually any wireless communication device, such as a wireless PDA, a conventional PDA in a synchronization cradle, a personal computer, a dedicated Internet appliance, or other devices. Moreover, the functions carried out by the various network entities shown, such as (without limitation) session manager 18, authentication server 26, voice-command platform 20, and data service node 22, could be performed by a single entity or multiple entities in combinations and configurations other than those shown. Thus, the entities illustrated may represent logical functions rather than physical devices without departing from the spirit and scope of the present invention. The invention is also suitable for use in other architectures, such as, for example, one where the voice command platform is replaced by a general purpose computing system that executes a business application or other application that the wireless user interacts with.

In operation, content from the application server 12 could reach the session manager 18 (via communications network 16) in WML, HDML, VXML, Extensible Markup Language (XML), or in another format. If the application initially provides for content or user interaction in voice-presentation mode by, for example, speaking a command that is recognized by voice-command platform 20, the session manager 18 would transmit the requested content to wireless client device 14 via the voice-command platform 20. If the application (or the application in conjunction with the session manager or other network entity) subsequently determined based on available bandwidth that a change in the interaction medium needs to be made, for example to a text medium, the session manager 18 could maintain the same session with server 12 but could reroute content to the data service node 22 for delivery to wireless client device 14 in a text mode.

In transmitting content from server 12 to wireless client device 14 that will ultimately be presented to the user in the initial interaction medium, the session manager 18 could first transcode the content, if necessary, to a voice format, such as VXML. The transcoding could also be done by voice-command platform 20 or by another network entity. Similarly, content that is to be delivered at wireless client device 14 for presentation in screen-based mode could be transcoded to WML, HDML, etc., if required, at either data service node 22, session manager 18 or elsewhere. In addition to converting from one protocol or markup language to another, the transcoding may also include the removal of content that cannot be, or need not be, presented in a given mode due to bandwidth limitations. For example, transcoding may remove video that is present in the content but that could not be rendered satisfactorily on the relatively small screen of a handheld device due to bandwidth limitations. As an alternative to transcoding, the session manager (or voice command platform) could simply delete or eliminate video, (or add it back in when bandwidth improves). Alternatively, the application server could execute instructions that formats the content to a different form or type, or eliminate a type of medium such as by execution of "goto" or other instruction, or invoke a routine that transmits content in a different type or format depending on the available content.

In addition to providing an interface between wireless client device 14 and server 12, the session manager may also be logically connected to profile server 28 in addition to various other servers that provide the functionality of the exemplary embodiment; profile server 28 stores users' preferences for presentation and other data. Some examples of details that profile server 28 can manage are: users' preferred voice for voice-command mode; users' personal address books; bookmarks which function as user-specific shortcuts to URIs or menu items; e-mail; and users' calendars. Profile server 28 could also include indications of users' preferred interaction medium.

Session manager 18 may further be logically connected to authentication server 26, which can access the account information associated with wireless client device 14 to verify that any requested services are authorized.

Figure 2:
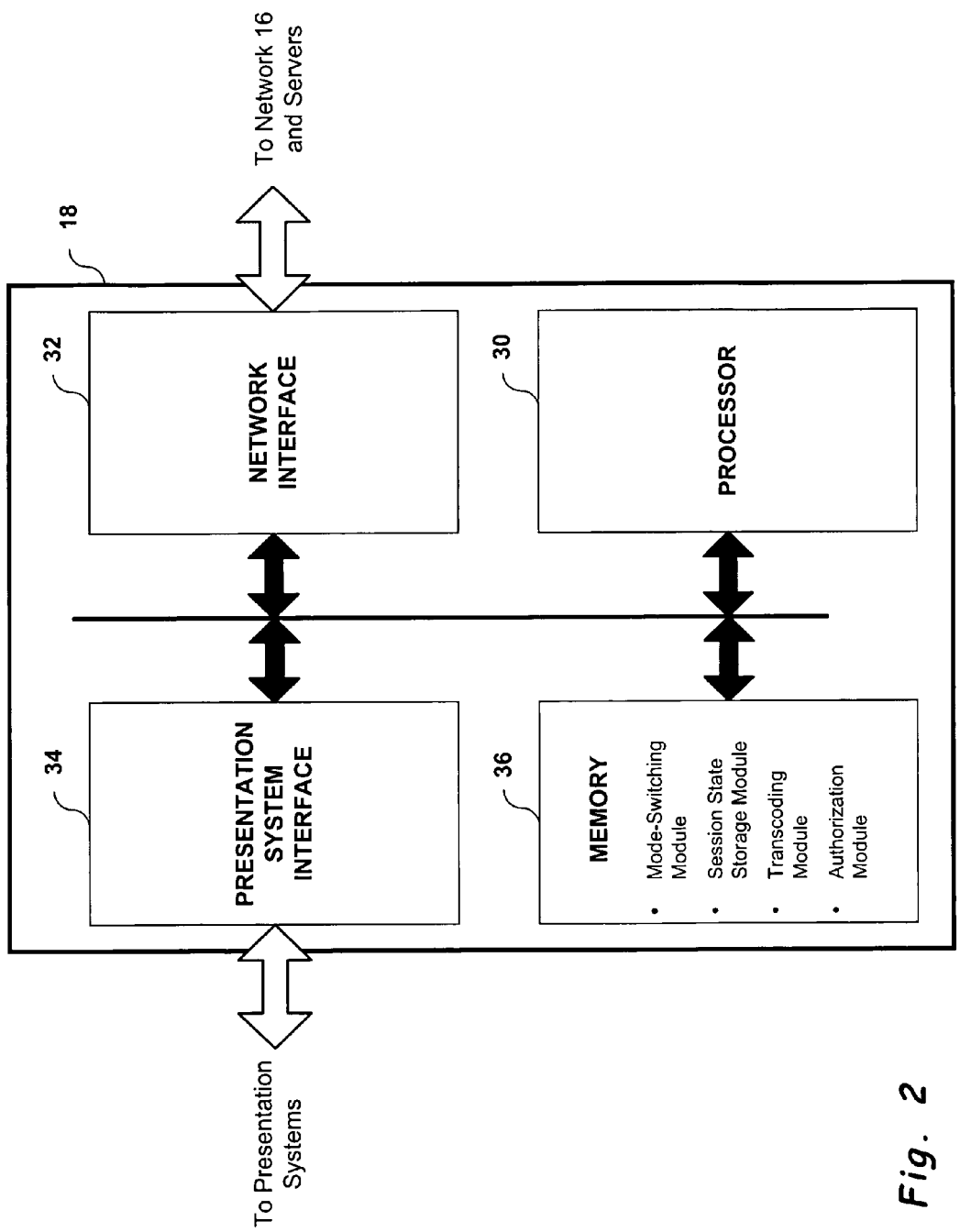
FIG. 2 is a block diagram of the session manager of FIG. 1.

FIG. 2 is a simplified diagram illustrating functional blocks that may be included within session manager 18. Generally, session manager 18 may include a processor 30, a network interface 32, a presentation system interface 34, and a memory 36, all communicatively interconnected. Processor 30 may include, for example, one or more integrated circuit microprocessors, and memory 36 may be a ROM, flash memory, non-volatile memory, etc. Alternatively, session manager 18 could be implemented using a device having a memory and processor contained in one integrated circuit.

Memory 36 may include more than one physical element, and may also include a number of software modules that are executable by processor 30 to carry out various functions described herein. These modules may include, but are not necessarily limited to, a mode-switching module, a session state storage module, a transcoding module, and a client device authorization module. Memory 36 may also include a state record that comprises the content associated with a session state as well as any required navigation indicators associated with the session state.

The present inventors have investigated user acceptability of multimedia on mobile devices and determined that certain type of frame rates and bandwidth resources are needed to obtain acceptable, and optimal, user experience for various types of presentation media. The results are shown in Table 1. The left hand column lists the types of video content delivery. The first four columns indicate the speech recognition bandwidth, frame rate, data rate and audio stream rate for the optimal user experience. The second group of four columns indicate the frame rate, data rate, audio stream rate and speech recognition bandwidth for acceptable user experience. For each type of video content, there are several combinations and permutations of frame rate and data rate that are possible to achieve an acceptable user experience.

TABLE 1

|  | Optimal Experience | | | | Acceptable Experience | | | |
| --- | --- | --- | --- | --- | --- | --- | --- | --- |
|  | Speech Rec. (Kbps) | Frame Rate (fps) | Data Rate (Kbps) | Audio Stream Rate (Kbps) | Frame Rate | Data Rate (Kbps) | Audio Stream Rate (Kbps) | Speech Rec. (Kbps) |
| Talking head | 4 | 4 | 74 | 12 | 4 | 30 | 12 | 4 |
|  |  |  |  |  | 10 | 35 | 12 | 4 |
|  |  |  |  |  | 14 | 57 | 12 | 4 |
| Animation | 4 | 4 | 74 | 12 | 4 | 32 | 12 | 4 |
|  |  |  |  |  | 9 | 29 | 12 | 4 |
|  |  |  |  |  | 14 | 30 | 12 | 4 |
| Low Live Action | 4 | 9 | 74 | 12 | 4 | 30 | 12 | 4 |
|  |  |  |  |  | 9 | 34 | 12 | 4 |
|  |  |  |  |  | 14 | 42 | 12 | 4 |
| Medium Live Action | 4 | 4 | 74 | 12 | 4 | 33 | 12 | 4 |
|  |  |  |  |  | 9 | 42 | 12 | 4 |
|  |  |  |  |  | 14 | 54 | 12 | 4 |

TABLE 1-continued

|  | Optimal Experience | | | | Acceptable Experience | | | |
| --- | --- | --- | --- | --- | --- | --- | --- | --- |
|  | Speech Rec. (Kbps) | Frame Rate (fps) | Data Rate (Kbps) | Audio Stream Rate (Kbps) | Frame Rate | Data Rate (Kbps) | Audio Stream Rate (Kbps) | Speech Rec. (Kbps) |
| High Live Action | 4 | 9 | 74 | 12 | 4 | 57 | 12 | 4 |
|  |  |  |  |  | 7 | 54 | 12 | 4 |
|  |  |  |  |  | 11 | 55 | 12 | 4 |
|  |  |  |  |  | 14 | 64 | 12 | 4 |

As TABLE 1 indicates, the bandwidth requirements for the various types of interaction media with voice, audio and video, have a lower limit for acceptable user experience and if the currently available bandwidth goes below the limit a change in interaction medium should be made. For example, if the current interaction medium is "medium action live" with audio and speech recognition, a total bandwidth of 33+12+4=49 Kbps is needed to meet a minimal acceptable user experience. If the bandwidth falls below that level, a change should to be made. The particular change to be made can be determined by instructions in the application itself, based on the currently available bandwidth and the state of the application. For example, if the bandwidth dropped to 42 Kbps, the application could decide to either drop the audio stream. If the bandwidth dropped to 20 Kbps, the application could drop the video content and retain audio and speech recognition. Obviously, the change in interaction medium can proceed from low bandwidth interaction medium to high interaction medium where current bandwidth improves and the new bandwidth is adequate for the new medium.

Control of Interaction Medium by Application

In a preferred embodiment, the application developer is able to control the interaction medium for wireless devices interacting with the application based on the available bandwidth. This will typically involve a new tag, variable or function call called "bandwidth" that would allow the application developer to determine the available bandwidth at any given state of an application and in turn provide instructions to provide the appropriate interaction medium depending on the current bandwidth. The following pseudo code is an example of how this could be implemented in XML environment.

```
      <?xml version="1.0"?>
      <!DOCTYPE html PUBLIC "-/ / W3C / / DTD XHTML +Voice / /
      EN"
      "xhtml + voice10.dtd"
      <html xmlns="http://www.w3.org/1999/xhtml"
      xmlns:vxml="http://w3.org/2001/voicexml20"
      xmlns:ev="http://www,w3.org/2001/xnl-events"
          <head>
      <title> Customize interaction based on bandwidth</title>
      if (Bandwidth <= xkbps)
        goto data
        <! - - first declare the voice handlers. - - >
            <vxml:form id="voice_city">
(1)         <vxml:grammar src="city.srgf" type="application/x-srgf"/>
            <vxml:prompt id="city_prompt">
            Please chose a city
            . . .
        <! - - done voice handlers. - - >
(2) data
      </head>
      <body>
      <h1> What You See Is What You Say</h1>
```

-continued

```
      <p> This example demonstrates a simple voice-enabled GUI hotel
      picker that permits the user to provide input using traditional GUI
      input peripherals or speak the same information.
      </p>
      <h2>Hotel Picker <h2>
      <form id=hotel_query" method="post" action="cgi/hotel.p1">
      <p> select a hotel in a city.</p>
      . . .
```

In this example, the voice block of code (block (1)) is bypassed by the goto command, and instead the data (text) block of code (2) is executed, thereby effectively changing the interaction medium from voice to text.

While the use of a "goto" command is one possibility for how the application may change interaction medium, other programming techniques are possible. For example, the application could define one or more events as XML events, and upon the occurrence of a particular event (bandwidth less than some defined value) the application reverts to a predefined interaction medium (e.g., speech mode, text mode, combination thereof, low live action video, etc.). As another alternative, the application could include reference files in the beginning of the code which define the environment for the application and specify the interaction medium/media depending on the measured bandwidth.

The checking of the current bandwidth "(If Bandwidth <=xKpbs)" may involve a subroutine or function call to obtain bandwidth information from some logic module or external source that can provide current bandwidth information. Methods and devices for determination of bandwidth over a CDMA or other wireless network are known in the art and therefore a detailed discussion of this aspect is omitted. See, e.g., Kevin Lai et al., *Nettimer: A Tool for Measuring Bottleneck Link Bandwidth*, Department of Computer Science, Stanford University, Apr. 4, 2001, the content of which is incorporated by reference herein. In this example, the application itself controls the interaction medium since the method of changing interaction medium is determined solely by the application instructions.

Control of Interaction Medium at Network Level

Figure 3:
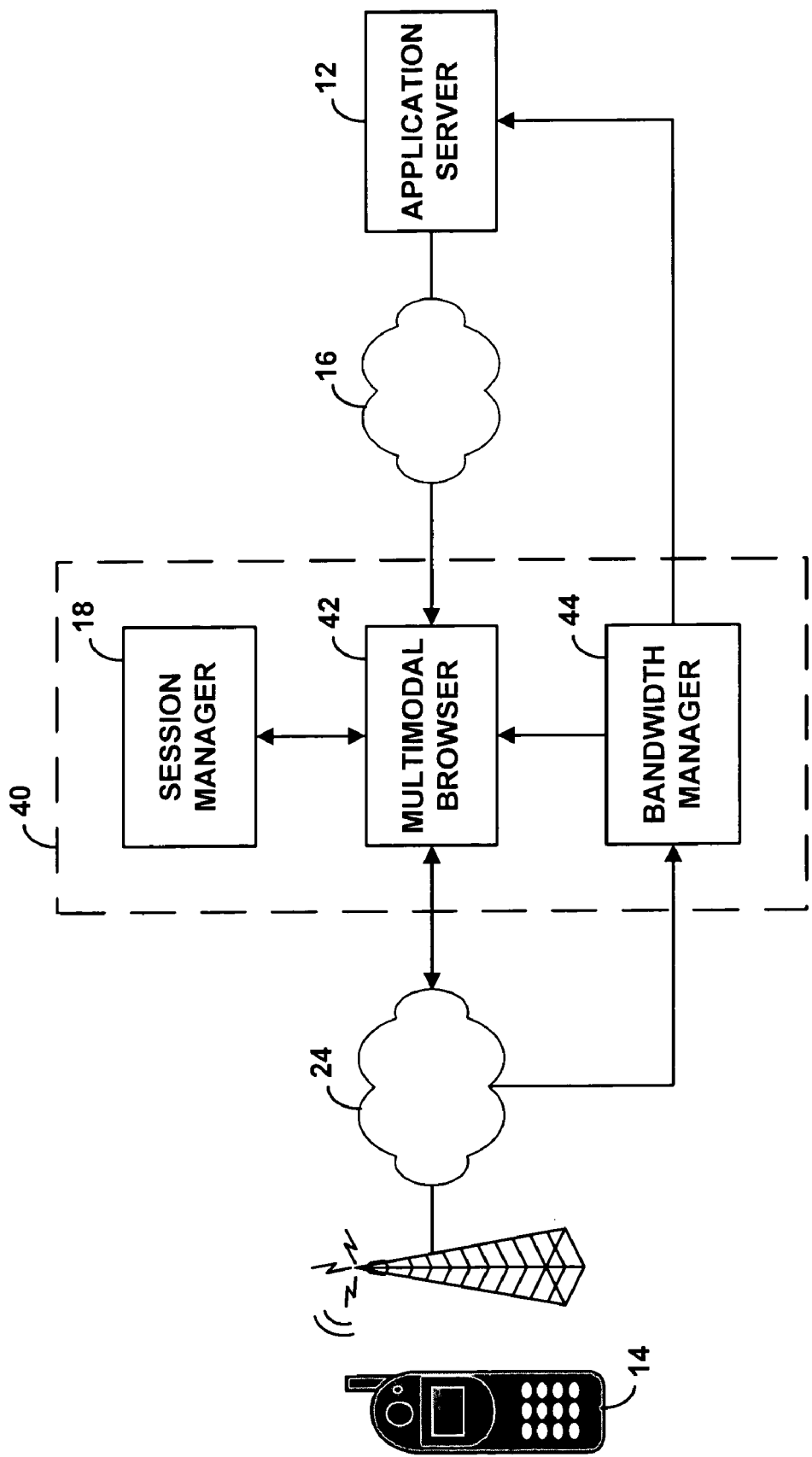
FIG. 3 is a block diagram of a network entity that controls the interaction medium either close or in combination with the application server.

FIG. 3 shows a block diagram of a network entity or node 40 that controls the interaction medium for a wireless device 14 communicating via a wireless network 24 with an application associated with an application server 12. The node 40 could take the form of a general purpose computing system that provides the function of a voice command platform or other multimodal type of system. In the example of FIG. 3, the network node includes a session manager 18, a multimodal browser 42 and a bandwidth manager 44. The session manager functions as described above and assists the multimodal browser is interpreting or providing context for user inputs (voice, text or other) from the wireless device 14. The bandwidth manager 44 comprises a logical unit that obtains bandwidth data from the wireless network 24 and provides current bandwidth information to the multimodal browser 42 and/or the application server 12.

In the example of FIG. 3, the multimodal browser 42 could obtain bandwidth information from the bandwidth manager 44 and responsively instruct the application server 12 to render only appropriate XML documents or content in a specific format that is appropriate for the current bandwidth. In this case, the intelligence in selecting the appropriate interaction medium is provided in the multimodal browser (e.g., it is programmed to select a given interaction medium depending on the current bandwidth).

As another alternative, the logical entity bandwidth manager 44 could not only determine the bandwidth but could also provide instructions to the multimodal browser to change the interaction medium based on the current bandwidth. For example, the bandwidth manager could provide instructions to the multimodal browser and/or the application server to only render or stream certain type of content. In this situation, the application developer does not have to make decisions on selection of interaction medium (or provide such instructions in the application itself), this function is carried out by a separate network entity (network node 40).

Figure 5:
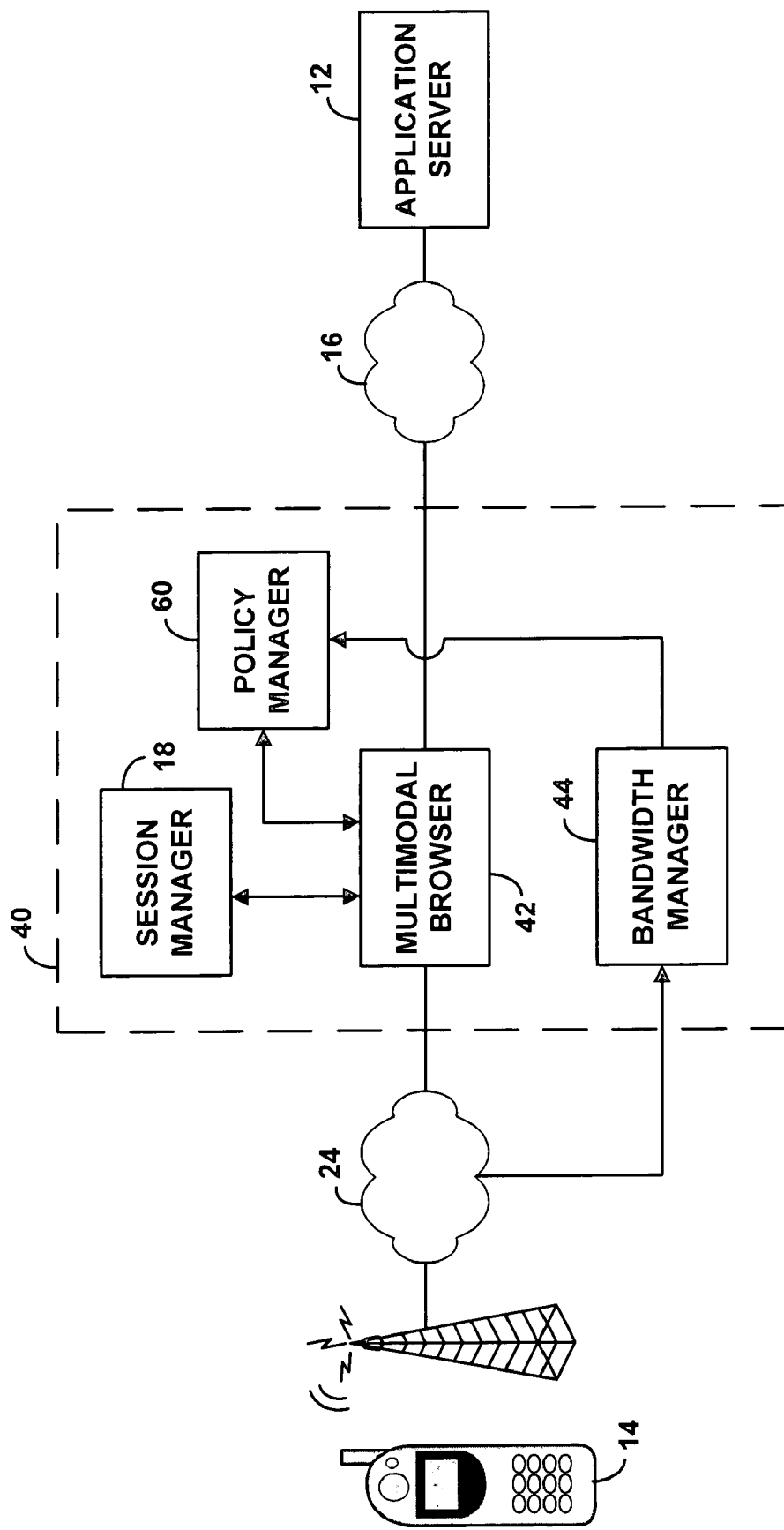
FIG. 5 is an illustration of an alternative embodiment of the network entity of FIG. 3, in which the network entity includes a policy manager which dictates how the interaction medium should change based on bandwidth, a bandwidth manager that monitors or obtains bandwidth information for the air interface for the wireless device, and a multimodal browser.

In the embodiment of FIG. 5, the bandwidth manager supplies bandwidth data to a separate logical entity 60 shown as a "policy manager." The policy manager 60 essentially consists of software that determines how to change the interaction medium based on bandwidth information supplied from the bandwidth manager 44. The policy manager may make reference to stored look-up tables, coded instructions, or other software structures or files that indicate the policies to follow (i.e., modes of interaction to use) based on measured levels of bandwidth. The policy manager would typically function on an overall or system level and would apply the same policies across multiple applications. The policy manager may also implement a mechanism for resolving conflicts in the interaction mode between instructions that may be present in the application, instructions from the user, and/or instructions contained in the multimodal browser itself.

Figure 6:
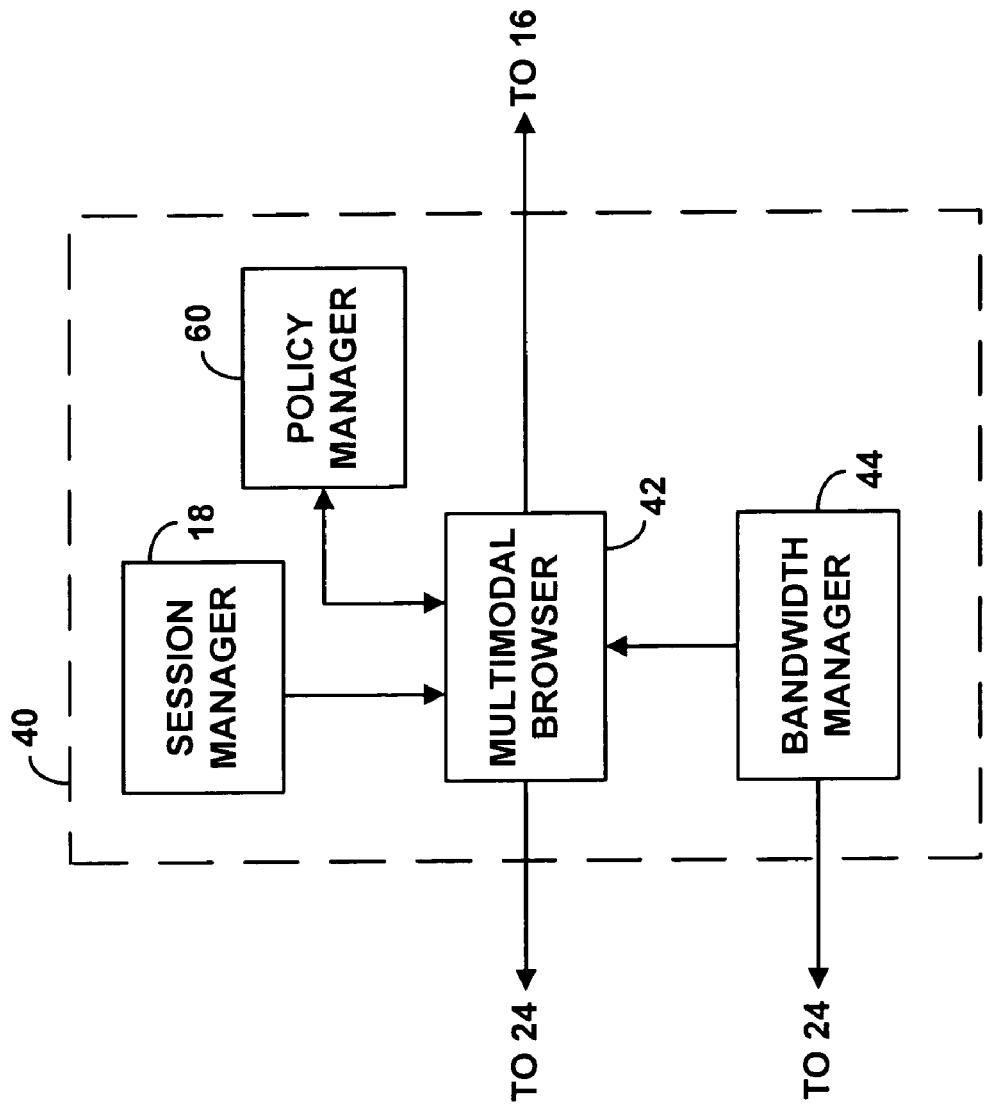
FIG. 6 is an alternative embodiment to the network entity of FIG. 5, in which the bandwidth manager supplies bandwidth information to the multimodal browser.

As an alternative configuration, the policy manager may contain instructions for how the application should be rendered in a particular bandwidth environment. In the Example of FIG. 6, the bandwidth manager 44 provides bandwidth data to the multimodal browser 42. The multimodal browser 42 consults the policy manager 60 to determine how to format content and information for the wireless device based on the bandwidth data supplied from the bandwidth manager 44.

User Selection of Interaction Medium

Figure 4:
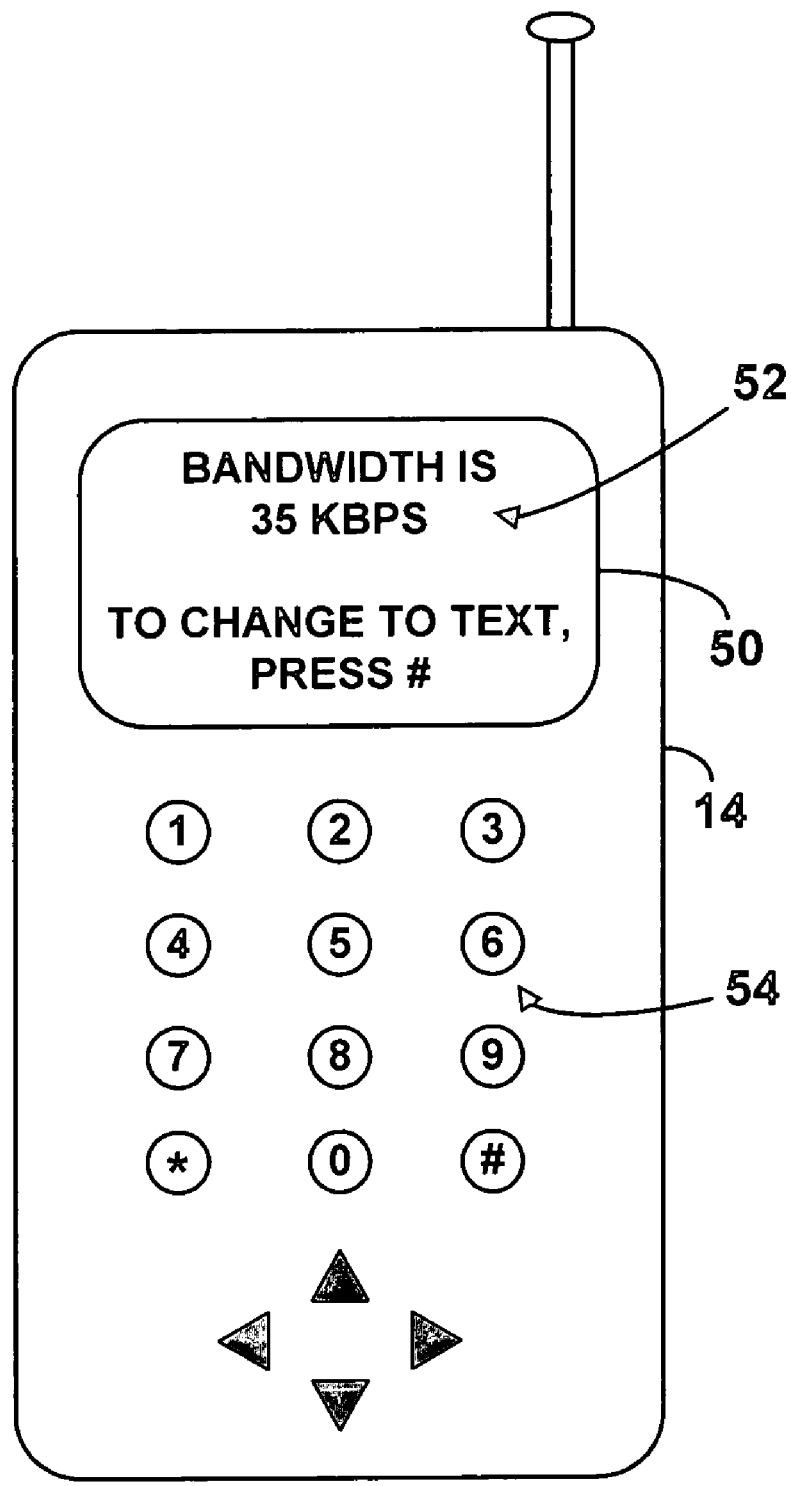
FIG. 4 is an illustration of a wireless device showing the display of bandwidth data and a prompt allowing the user to change the interaction medium.

As noted previously, it is possible to provide the user with the opportunity to interactively select a new interaction medium for communications both to and from the network. This embodiment will be described in conjunction with FIG. 4. The wireless device 14 in this example includes a processor and memory storing instructions for receiving bandwidth information from the wireless network and displaying bandwidth information to the user on the wireless device. Further, the instructions provide the user with prompts or other means by which the user can interactively change or select a new interaction medium. In the example of FIG. 4, the wireless device has a display 50 in which a text message 52 is displayed showing the currently bandwidth on the air interface. The manner in which this information is displayed is of course not particularly important, in the present example it is simply a numerical readout (35 Kbps). The display further includes a prompt that allows the user to select a new interaction medium for providing input to the application, for receiving content or information from the network, or both. Here the prompt provides the user with a new available mode for providing input, and the prompt is simply "to change to text mode, press #." Other possibilities exist for changing the interaction medium. For example, if the application supports voice commands and the speech recognition medium is currently active, the user could simply speak "change to text", "switch to text" or "text." Alternatively, the user could simply press one or more of the keys 54 in the keypad or use other user interface tools to select the new medium. These commands could be for bother interaction with the application in terms of communications in the upstream direction (to the network) and for transmission of content or information from the application to the wireless device in the downstream direction (from the network to the device).

As another example, the bandwidth manager of FIG. 3 could detect bandwidth falling below a threshold that would necessitate a change and could instruct the multimodal browser 42 to issue a voice prompt to the user of the wireless device, e.g., "Would you like to change to text? If so, say yes, if not, say no."

As another example, consider a delivery driver for a beverage company that enters delivery information via a special purpose wireless device for purposes of entering delivery information. The wireless devices interacts with a delivery and inventory application maintained in a network node in the beverage company's home network In the present example, the application is designed to normally provide audio (speech), and text interfaces on the wireless device. As the driver makes deliveries, the driver interacts with the voice command platform to relay delivery information. For example, the driver could simply speak "Delivery Acme Pub, 10 cases light beer, 2 kegs ale, 10:30 am." When the driver arrives at the next delivery location, the reception is weak and the display of bandwidth on the wireless device indicates that bandwidth is below that needed for both speech and text interactions. The driver is then provided with a prompt to change to text only, or speech only. Since speech is quicker and easier to use, the driver selects speech only (by speaking for example "change to speech only" or by pressing the # key in response to a prompt). This information is relayed by the wireless network to the application server or network node executing the delivery application.

From the above description, it will be appreciated that we have described an improvement to a wireless communications device having a display, a memory and a processor. The improvement comprises providing in the display visually perceptible indicia of the available bandwidth for communication over an air interface to the wireless device, and providing instructions in the memory executable by the processor for enabling a user to change an interaction medium for the wireless device depending on the available bandwidth, e.g., by providing a response to an appropriate prompt.

From the above discussion, it will also be appreciated that a method has been described of controlling the medium for interaction between a user of a wireless device and an application accessed by the wireless device. The method includes the steps of a) determining currently available bandwidth for transmissions to the wireless device over a wireless network connecting a packet switched network to the wireless device; and b) changing the medium for interaction between the user of the wireless device and the application from a first medium to a second medium based on the bandwidth determined in step a). As noted above, the step b) could be performed by execution of machine-readable instructions coded in the application. Alternatively, the method step b) could be performed by a network entity in the packet switched network, such as a session manager, bandwidth manager, policy manager, voice browser, content server, or otherwise.

Also, as indicated in the above example of FIG. 4, the method could involve the step of displaying on the wireless device an indication of the current bandwidth, and wherein step b) is performed by user selection of the second interaction medium via operation of the wireless device and communication of the selection to a network entity in the packet switched network.

While embodiments have been described in which the first medium is audio (speech) and the second medium is text, it will be appreciated that the first interaction medium could consist of video of a first type at a first level of bandwidth usage (e.g., high live action), and wherein the second interaction medium could consist video of a second type at a second level of bandwidth usage (e.g., talking head or low live action), the second level different from the first level.

As another possibility, the first interaction medium could include a speech (audio) mode for interacting with the application, and wherein step b) comprises the step of disabling the speech mode.

Variations from the disclosed embodiments are possible without departure from the scope of the invention. Other methods for reducing bandwidth for audio (speech) input can be used without changing the interaction medium, for example by implemented distributed speech recognition algorithms in the wireless devices and in a speech recognition engine in the voice command platform.

The invention claimed is:

1. A method of controlling the medium for interaction between a user of a wireless device and an application accessed by said wireless device the application associated with a network element in a packet switched network comprising the steps of:
   a) determining currently available bandwidth for transmissions between said wireless device and a wireless network connecting said packet switched network to said wireless device;
   b) changing the medium for interaction between said user of said wireless device and said application from a first medium to a second medium based on said bandwidth determined in step a); and
   c) displaying on said wireless device an indication of said bandwidth, and wherein step b) is performed by user selection of said second medium via operation of said wireless device and communication of said selection to a network entity in the packet switched network, wherein
   multimedia content is streamed over said wireless network to said wireless device and wherein said first interaction medium comprises video of a first type at a first level of bandwidth usage, and
   wherein said second interaction medium comprises video of a second type at a second level of bandwidth usage, said second level less than said first level.

2. The method of claim 1, wherein said first interaction medium comprises audio, and wherein said second interaction medium comprises text.

3. The method of claim 1, wherein said first interaction medium includes a speech (audio) mode for interacting with said application, and wherein step b) further comprises the step of disabling said speech mode for interacting with said application.

4. A system for controlling the interaction medium for a wireless communication device interacting with an application accessed by said wireless device over a packet switched network, comprising;
   a node comprising hardware or software for determining the bandwidth for communications over an air interface to said wireless device; and
   a voice command platform providing a voice browser for interacting with a user of said wireless communications device,
   said voice command platform responsive to said node so as to change the interaction medium from a first interaction medium to a second interaction medium based on the determination of bandwidth, wherein
   the system further comprises an application server, and wherein said voice command platform provides instructions to said application server to render content associated with said application for said wireless device in said second interaction medium.

* * * * *